US012467592B2

(12) United States Patent
Wu

(10) Patent No.: US 12,467,592 B2
(45) Date of Patent: Nov. 11, 2025

(54) LIGHT STRING AND ORNAMENTAL ARTICLE INCLUDING THE SAME

(71) Applicant: Marvellous Day Industrial International Limited, Tortola (VG)

(72) Inventor: Hsin-Wei Wu, Hsinchu (TW)

(73) Assignee: MARVELLOUS DAY INDUSTRIAL INTERNATIONAL LIMITED, Tortola (VG)

( * ) Notice: Subject to any disclaimer, the term of this patent is extended or adjusted under 35 U.S.C. 154(b) by 0 days.

(21) Appl. No.: 19/001,466

(22) Filed: Dec. 25, 2024

(65) Prior Publication Data

US 2025/0207745 A1 Jun. 26, 2025

Related U.S. Application Data

(60) Provisional application No. 63/614,736, filed on Dec. 26, 2023.

(51) Int. Cl.

| | |
|---|---|
| ***F21S 4/10*** | (2016.01) |
| ***A47G 33/06*** | (2006.01) |
| ***A47G 33/08*** | (2006.01) |
| ***F21W 121/04*** | (2006.01) |
| ***F21Y 113/00*** | (2016.01) |

(52) U.S. Cl.

CPC ................ *F21S 4/10* (2016.01); *A47G 33/06* (2013.01); *A47G 2033/0827* (2013.01); *F21W 2121/04* (2013.01); *F21Y 2113/00* (2013.01)

(58) Field of Classification Search

CPC ...... F21S 4/00; F21S 4/10; A47G 2033/0827; A47G 33/06

See application file for complete search history.

(56) References Cited

U.S. PATENT DOCUMENTS

| | | | | |
|---|---|---|---|---|
| 638,895 A * | 12/1899 | Wallis | ...................... | F21S 4/001 307/157 |
| 2,402,766 A * | 6/1946 | Moore | ................... | H01R 11/24 439/416 |
| 2,558,029 A | 6/1951 | Wood | | |
| 3,617,732 A * | 11/1971 | Fisher | ........................ | F21S 4/10 428/23 |

(Continued)

FOREIGN PATENT DOCUMENTS

| | | | |
|---|---|---|---|
| DE | 8712188 U1 | 12/1987 | |
| DE | 29909590 U1 * | 8/2000 | .............. F21V 21/35 |

(Continued)

OTHER PUBLICATIONS

Extended European search report and search opinion (5 pages) dated May 26, 2025 for European patent application No. 24223017.5.

*Primary Examiner* — Alexander K Garlen

(74) *Attorney, Agent, or Firm* — WPAT, P.C.; Anthony King

(57) ABSTRACT

The present disclosure proposes an article, which includes a support structure, a plurality of needles connected to the support structure, and a light string. The light string includes a flexible conductive wire affixed to the needles, and a plurality of light sources. Each of the light sources includes at least two leads electrically coupled to the flexible conductive wire. The leads of the light sources arranged at different heights of the article include different lengths.

14 Claims, 14 Drawing Sheets

(56) References Cited

U.S. PATENT DOCUMENTS

| | | | | |
|---|---|---|---|---|
| 4,012,631 | A | 3/1977 | Creager | |
| 4,020,201 | A | 4/1977 | Miller | |
| 6,588,914 | B1 * | 7/2003 | Tang | F21S 4/10 362/249.19 |
| 10,070,675 | B2 | 9/2018 | Chen | |

FOREIGN PATENT DOCUMENTS

| | | | | |
|---|---|---|---|---|
| DE | 20021477 | U1 * | 3/2001 | F21V 23/06 |
| EP | 0945670 | A2 * | 9/1999 | F21S 4/10 |

* cited by examiner

LIGHT STRING AND ORNAMENTAL ARTICLE INCLUDING THE SAME

PRIORITY CLAIM AND CROSS-REFERENCE

This application claims priority to U.S. provisional application No. 63/614,736 filed Dec. 26, 2023, the disclosure of which is hereby incorporated by reference in its entirety.

TECHNICAL FIELD

This application relates to an ornamental article, and more particularly, to a design of a light string of an ornamental article.

BACKGROUND

Many households have ornamental articles arranged in their living rooms or bedrooms, or hung on doors, fences or balustrades, as decorations. Examples of these ornamental articles include Christmas trees, wreaths, garlands, and the like. Various types of small ornamental pieces, such as lights, tinsels, baubles, icicles and figurines, may be used to beautify the ornamental articles. Although the decoration types and materials have evolved over time, there are still aspects of the ornamental articles that need further improvement, especially those using light to enhance aesthetic effects of the ornamental articles.

SUMMARY

A first aspect of the present disclosure discusses an article, which includes a support structure, a plurality of needles connected to the support structure, and a light string. The light string includes a flexible conductive wire affixed to the support structure or the needles, and a plurality of light sources. Each of the light sources includes at least two leads electrically coupled to the flexible conductive wire. The leads of the light sources arranged at different heights of the article have different lengths.

A second aspect of the present disclosure discusses an article, which includes a main body and a light string. The light string includes a flexible conductive wire; a plurality of light sources, wherein each of the light sources includes at least two leads electrically coupled to the flexible conductive wire; and a plurality of connectors guiding the leads of the respective light sources to the flexible conductive wire. The leads of the light sources arranged at different heights of the main body have different lengths.

A third aspect of the present disclosure discusses a light string, including a flexible conductive wire; a plurality of light sources electrically coupled to the flexible conductive wire, wherein each of the light sources includes at least two leads; and a plurality of connectors electrically coupling the leads of respective light sources to the flexible conductive wire. The leads of the light sources at different locations of the flexible conductive wire have different lengths.

BRIEF DESCRIPTION OF THE DRAWINGS

Aspects of the present disclosure are best understood from the following detailed description when read with the accompanying figures. It should be noted that, in accordance with the standard practice in the industry, various structures are not drawn to scale. In fact, the dimensions of the various structures may be arbitrarily increased or reduced for clarity of discussion.

Figure 1:
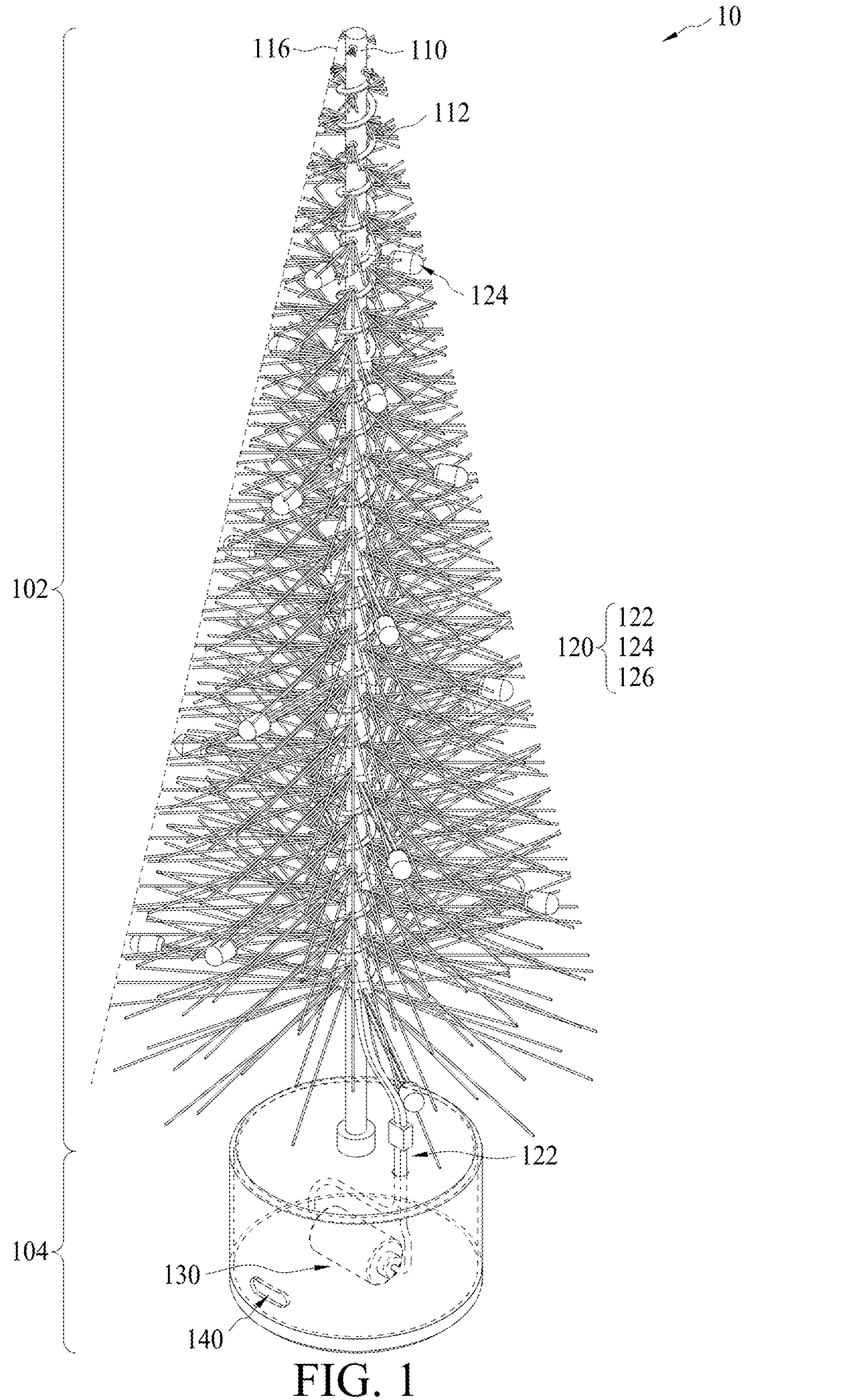
FIG. 1 shows a perspective view of an article, in accordance with some embodiments of the present disclosure.

In the following detailed description, for purposes of explanation, numerous specific details are set forth in order to provide a thorough understanding of the disclosed embodiments. It will be apparent, however, that one or more embodiments may be practiced without some of these details. In other instances, well-known structures and devices are schematically shown in order to simplify the drawings. Further, like reference numerals across different figures dictate similar features, and therefore a detailed explanation of the similar feature may be provided when such features are first introduced in the disclosure, and may not be subsequently repeated.

DETAILED DESCRIPTION

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features are not in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper,” “on” and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first, "second" and "third" when used herein do not imply a sequence or order unless clearly indicated by the context.

As used herein, the term "connected" may be construed as "electrically connected," and the term "coupled" may also be construed as "electrically coupled." The terms "connected" and "coupled" may also be used to indicate that two or more elements cooperate or interact with each other. The terms "couple" or "connect" used throughout the present disclosure may also refer to physical or electrical linkage between two or more objects. These objects may also be referred to as being "coupled" or "connected" through exchange of data or information. These "coupled" or "connected" objects may be in direct contact in some cases or indirect contact through other intervening objects.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the deviation normally found in the respective testing measurements. Also, as used herein, the terms "about," "substantial" or "substantially" generally mean within 10%, 5%, 1% or 0.5% of a given value or range. Alternatively, the terms "about," "substantial" or "substantially" mean within an acceptable standard error of the mean when considered by one of ordinary skill in the art. Other than in the operating/working examples, or unless otherwise expressly specified, all of the numerical ranges, amounts, values and percentages such as those for quantities of materials, durations of time, temperatures, operating conditions, ratios of amounts, and the likes thereof disclosed herein should be understood as modified in all instances by the terms "about," "substantial" or "substantially." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

FIG. 1 shows a perspective view of an article 10, in accordance with some embodiments. The article 10 is illustrated in FIG. 1 as an example of an ornamental article, for example, a Christmas tree set of a miniature size suitable for tabletop decoration. Although not separately demonstrated, other types of artificial ornamental articles are also within the contemplated scope of the present disclosure.

The article 10 includes a main body 102 and a pedestal 104 supporting the main body 102. According to some embodiments, the main body 102 includes a support structure 110, and a plurality of needles 112 or branches affixed, connected or attached to the support structure 110. The main body 102 or the support structure 110 is supported by and extends upward from the pedestal 104, wherein the needles 112 extend outward radially from the support structure 110. Throughout the present disclosure, the support structure 110 can include a trunk, a stem, a branch, and any other structures of the article 10 to serve as a support of other components, such as the needles 112. The needles 112 may mimic the acicular needles of a coniferous tree and include a needle shape. The tips of the needles 112 may form a cone-shaped profile or surface 116 of the article 10. According to some embodiments, for another type of ornamental article, the needles 112 are replaced with leaves 112.

According to some embodiments, the article 10 includes one or more ornamental pieces attached thereto or hung thereon. For example, the article 10 includes one or more light strings 120 affixed thereto. FIG. 1 illustrates only one piece of light string 120 for illustrative purposes, and other numbers of the light strings 120 are also within the contemplated scope of the present disclosure.

According to some embodiments, the light string 120 includes a flexible conductive wire 122 and a plurality of light sources 124 electrically coupled to the flexible conductive wire 122. According to some embodiments, the light string 120 further includes a plurality of connectors 126 (not separately shown in FIG. 1 but illustrated in FIG. 3) electrically guiding the respective light sources 124 to the flexible conductive wire 122.

According to some embodiments, the pedestal 104 includes a battery 130 on the inside thereof. The pedestal 104 may further include a battery holder (not separately shown) for accommodating the battery 130. The battery 130 is configured to supply power to the light string 120. According to some embodiments, the pedestal 104 further includes a switch (not separately shown) arranged between the battery (or the battery holder) and the flexible conductive wire 122 to control turn-on and turn-off of the light string 120. According to some embodiments, the pedestal 104 alternatively or additionally includes a power socket 140 configured to supply power to the battery 130 or to supply power directly to the light string 120 from an external power source, e.g., mains power, an electronic device, or a portable power bank. The power socket 140 may be a USB connector or another type of charging connector. According to some embodiments, the arrangement of the pedestal 104 and the battery 130 make the article 10 suitable to serve as a desktop decoration, and the height of the article 10 may be about 50 cm or less, e.g., the article 10 has a height in a range between about 10 cm and about 40 cm. The light string 120 may greatly improve an aesthetic effect of the article 10 through glowing of the light sources 124. According to some embodiments, the light source 124 includes a light-emitting element 1242 or a light bulb arranged close to the tips of the needles 112 of the article 10 away from the support structure 110 of the article 10. As a result, an illuminous effect of the light string 120 for the article 10 becomes more eye-catching, especially when the article 10 is displayed against a dark background.

Figure 2A:
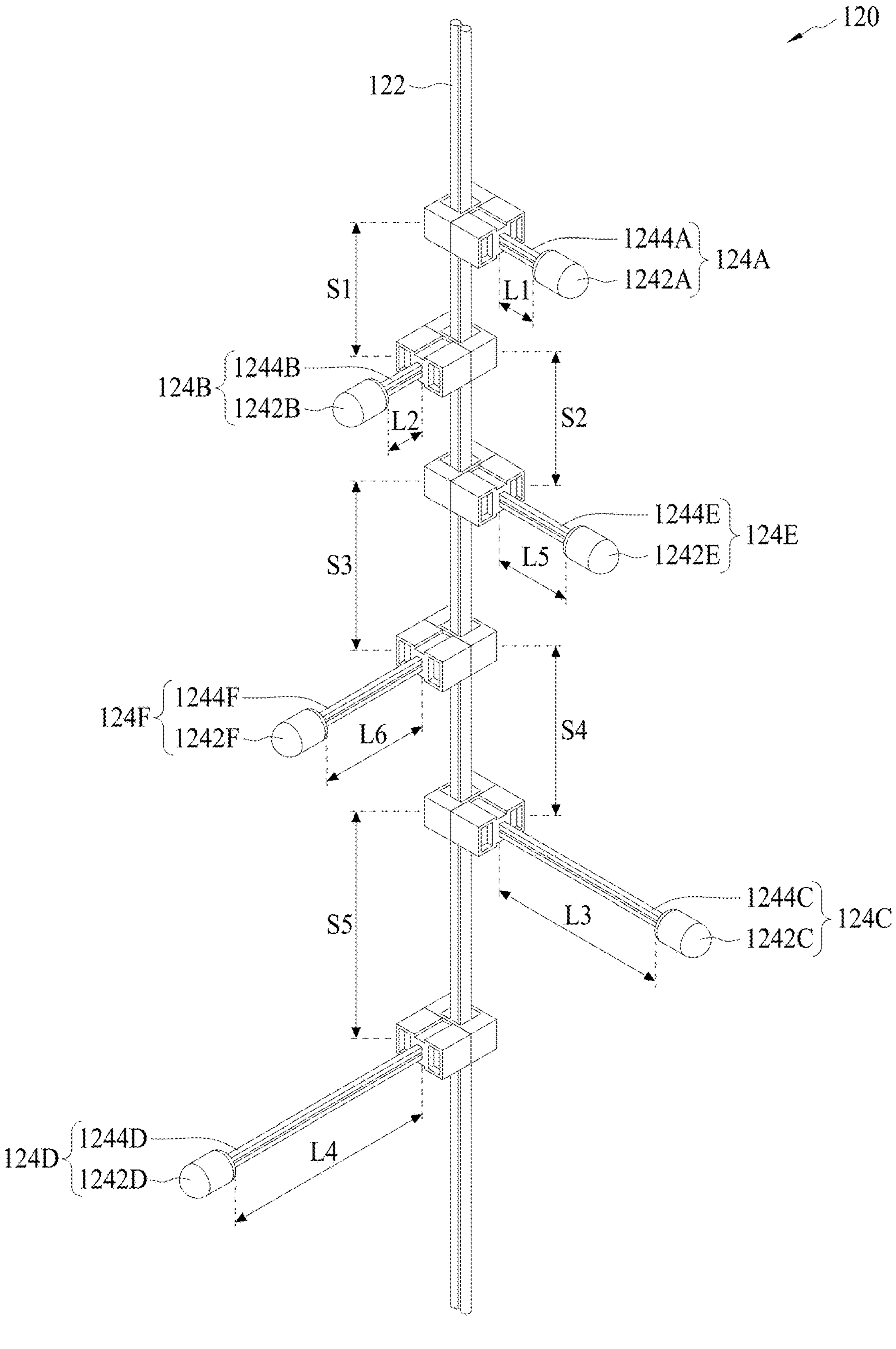
FIGS. 2A and 2B are schematic diagrams of a light string, in accordance with some embodiments of the present disclosure.
Figure 2B:
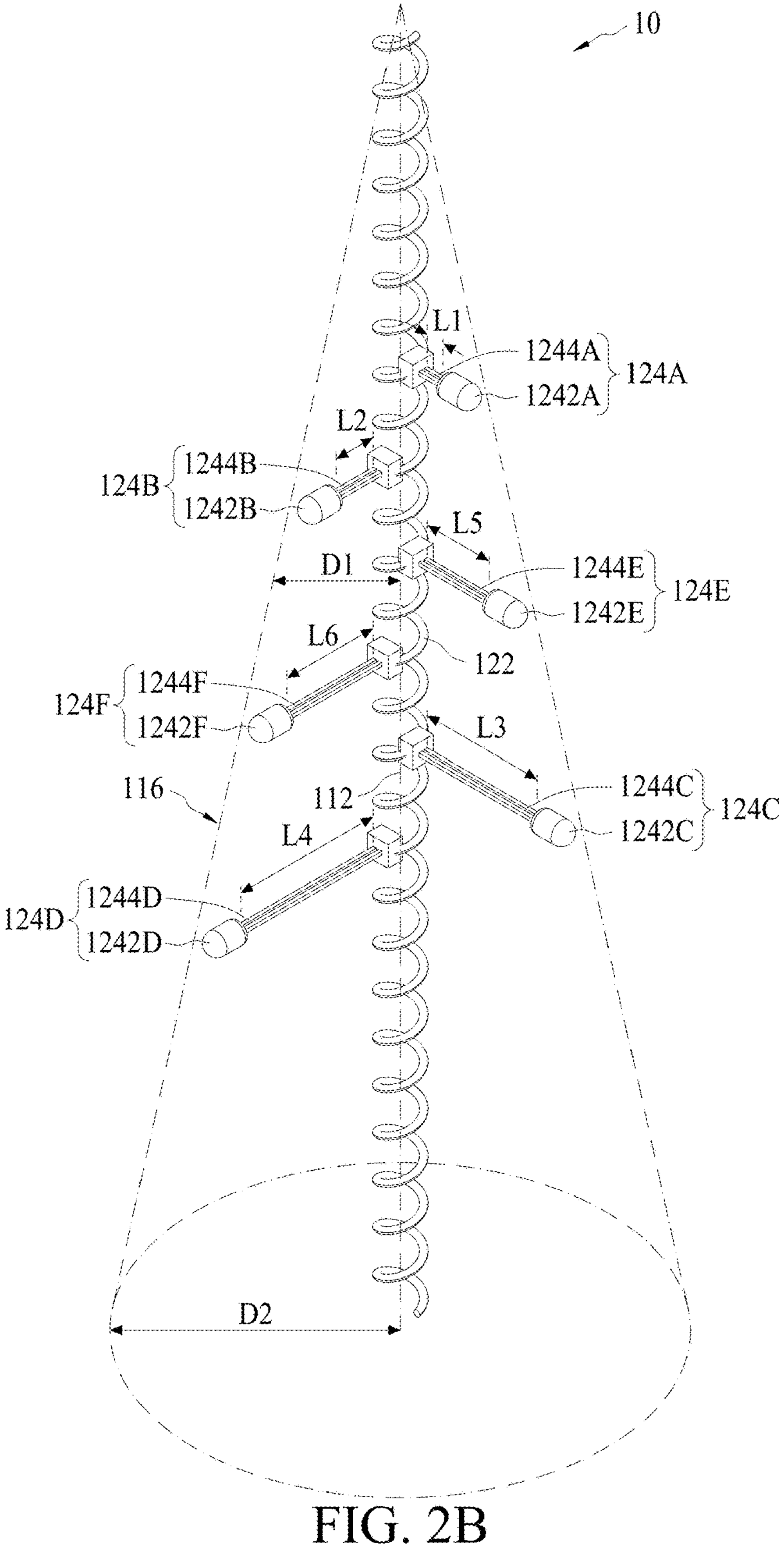

FIGS. 2A and 2B are schematic diagrams of the light string 120, in accordance with some embodiments. According to some embodiments, FIG. 2A shows a standalone light string 120 in a straightened manner, and FIG. 2B shows the light string 120 wrapped around an exterior portion of the support structure 110 of the article 10. Referring to FIG. 2A, the flexible conductive wire 122 functions as a power channel and a connection hub for the light sources 124, e.g., exemplary light sources 124A, 124B, 124C, 124D, 124E and 124F, wherein each of the light sources 124 includes the light-emitting element 1242 (e.g., exemplary light-emitting elements 1242A, 1242B, 1242C, 1242D, 1242E and 1242F) and a plurality of pairs of leads 1244 (e.g., exemplary leads 1244A, 1244B, 1244C, 1244D, 1244E and 1244F). According to some embodiments, the light-emitting element 1242 may be formed of a light-emitting diode (LED), a light bulb, or another suitable light-emitting device. According to some embodiments, a conductive core layer of the flexible conductive wire 122 and the leads 1244 are formed of conductive materials, such as aluminum, copper, silver, gold, tungsten, iron, tin, or other suitable conductive materials. According to some embodiments, the leads 1244 are formed of a hard material, such as metal, and are configured to extend in a predetermined direction and support the light-emitting element 1242. According to some embodiments, the leads 1244 are formed of inflexible materials.

According to some embodiments, the light sources 124A to 124F are electrically coupled to the flexible conductive wire 122 through electrical coupling of the respective pairs of leads 1244A to 1244F and the flexible conductive wire 122. The electrical coupling can be achieved by soldering or electrical attachment through connectors or adaptors. Further, the locations where the light sources 124A to 124F are electrically coupled to the flexible conductive wire 122 are determined as appropriate. According to some embodiments, adjacent pairs of the light sources 124A, 124B, 124E, 124F, 124C and 124D are spaced apart by distances or spacings S1, S2, S3, S4 and S5, respectively, on the flexible conductive wire 122 when the flexible conductive wire 122 is straightened. The distances S1 to S5 may be determined depending upon the orientations of the light sources 124A to 124F when they are hung on the surface 116 of the article 10. The distances S1 to S5 may be substantially equal or different from each other.

According to some embodiments, the lengths of the leads 1244 of different light sources 124 are different, and such lengths depend upon the locations of the light sources 124 on the light string 120 or upon their heights on the article 10 when they are attached to the article 10. The leads 1244A, 1244B, 1244C, 1244D, 1244E and 1244F may have lead lengths L1, L2, L3, L4, L5 and L6, respectively. According to some embodiments, the lengths L1 to L6 of the respective leads 1244A to 1244F are adjusted such that the light-emitting elements 1242A to 1242F can be arranged immediately adjacent to, or right at, the tips of the needles 112 away from the support structure 110 of the article 10 when the light string 120 wraps around the exterior portion of the support structure 110. The arrangement of the lengths L1 to L6 allows the light-emitting elements 1242 to be as close to the profile or surface 116 of the needles 112 as possible. According to some embodiments, the lengths L1 to L6 of the respective leads 1244A to 1244F of the respective light sources 124A to 124F disposed corresponding to the respective tips of the needles 112 away from the support structure 110 are substantially equal to the distances L1 to L6 between the support structure 110 and the tips of the needles 112 away from the support structure 110 where the light-emitting elements 1242A to 1242F are arranged. Through appropriate arrangement of the lengths L1 to L6 of the respective leads 1244A to 1244F, the light-emitting elements 1242A to 1242F are not obstructed by the needles 112 of the article 10, and therefore the luminous performance rendered by the light sources 124A to 124F can be maximized.

As discussed above, the flexible conductive wire 122 wraps around the exterior portion of the support structure 110 while the leads 1244A to 1244F extend outwardly to be close to the surface 116 of the needles 112 such that the light-emitting elements 1242A to 1242F can be arranged as close to the surface 116 of the needles 112 as possible. According to some embodiments, the surface 116 of the needles 112 has a conical shape. In other words, a horizontal distance between the support structure 110 and the surface 116 may increase at descending positions from a top of the article 10 to a bottom of the article 10. Therefore, the lengths L1, L2, L5, L6, L3 and L4 are monotonically increasing for the respective light sources 124A, 124B, 124E, 124F, 124C and 124D from the top of the article 10 to the bottom of the article 10, or equivalently, from a first end of the light string 120 to a second end of the light string 120.

Referring to FIG. 2B, since the light-emitting elements 1242C and 1242D are arranged closer to a bottom of the article 10 than the light-emitting elements 1242A, 1242B, 1242E and 1242F, the lengths L3 and L4 of the respective leads 1244C and 1244D are made greater than the lengths L1, L2, L5 and L6 of the leads 1244A, 1244B, 1244 and 1244F, respectively. According to some embodiments, the lengths L3 and L4 are substantially equal when the light-emitting elements 1242C and 1242D are arranged at a substantially equal height of the article 10. Similarly, since the light-emitting elements 1242A and 1242B are arranged closer to a top of the article 10 than the light-emitting elements 1242C, 1242D, 1242E and 1242F, the lengths L1 and L2 of the respective leads 1244A and 1244B are made less than the leads L3, L4, L5 and L6 of the respective leads 1244C, 1244D, 1244E and 1244F. According to some embodiments, the lengths L1 and L2 are substantially equal when the light-emitting elements 1242A and 1242B are arranged at a substantially equal height of the article 10.

Figure 3:
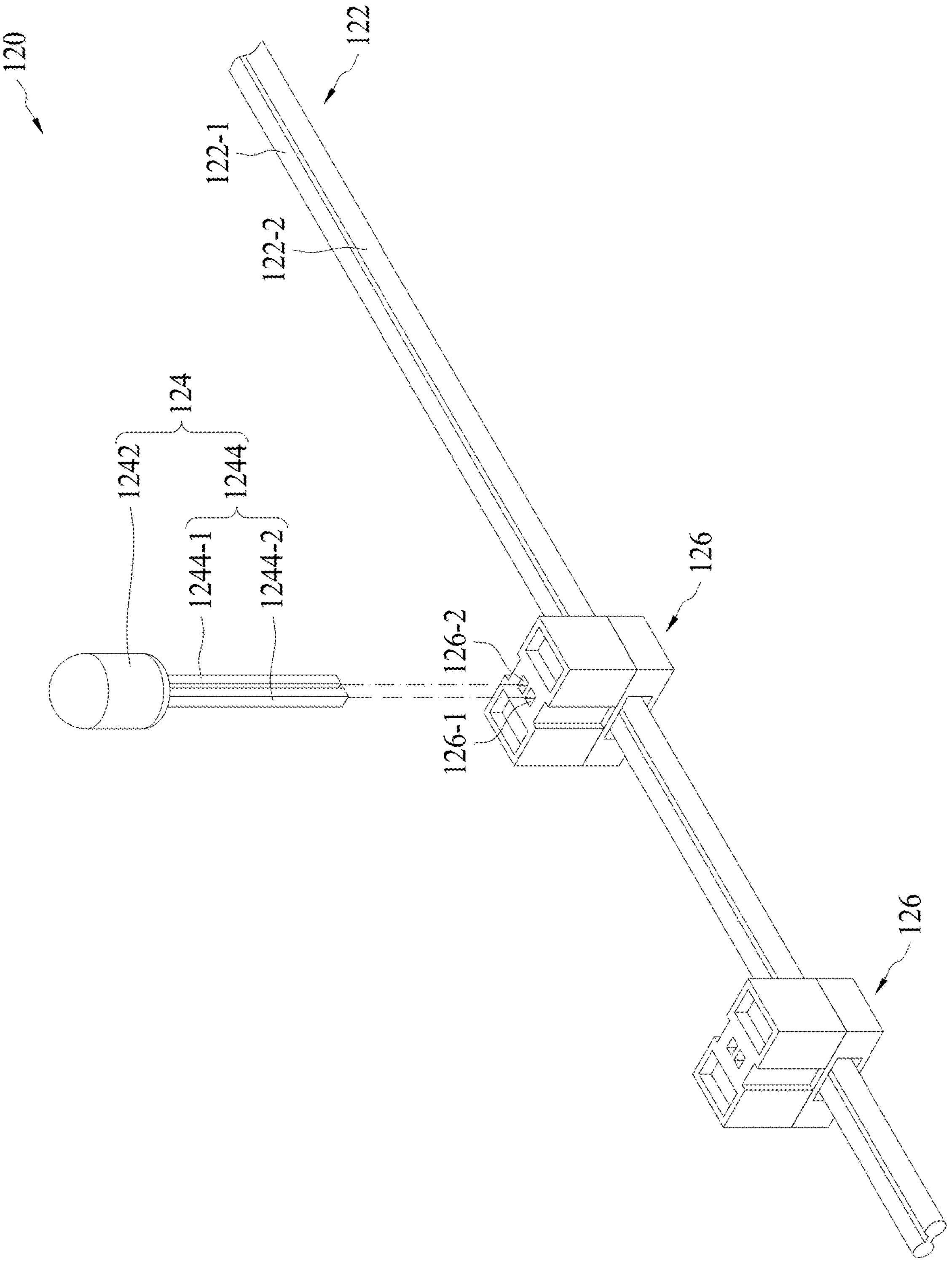
FIG. 3 is a schematic diagram of a light string, in accordance with some embodiments of the present disclosure.

FIG. 3 is a schematic diagram of the light string 120, in accordance with some embodiments of the present disclosure. The light string 120 includes the flexible conductive wire 122, an exemplary light source 124 and an exemplary connector 126. The flexible conductive wire 122 may include two conductive lines 122-1 and 122-2 arranged adjacent to each other. The conductive lines 122-1 and 122-2 may be configured to supply power and ground, respectively, to the light source 124. According to some embodiments, the flexible conductive wire 122 is configured to supply direct current (DC) power provided by the battery 130 or the power socket 140.

According to some embodiments, the connector 126 is configured to guide the leads 1244 of the light source 124 to the flexible conductive wire 122. According to some embodiments, the connector 126 includes a two-pin socket having a first slot 126-1 and a second slot 126-2, and the light source 124 includes two leads 1244-1 and 1244-2. The slots 126-1 and 126-2 are arranged in predetermined positions to receive and guide the leads 1244-1 and 1244-2 such that the conductive lines 122-1 and 122-2 can be aligned with the leads 1244-1 and 1244-2, respectively. Further, the connector 126 includes an electrically insulating frame configured to protect the conductive portions of the leads 1244-1, 1244-2 and the conductive lines 122-1, 122-2 from external contamination or undesired short-circuiting. Referring to FIG. 2B and FIG. 3, the connectors 126 are arranged close to an exterior portion of the support structure 110 when the flexible conductive wire 122 wraps around the exterior portion of the support structure 110. As a result, the lengths L1 to L6 of the respective leads 1244A to 1244F are substantially equal to the distances L1 to L6 between the support structure 110 and the tips of the needles 112.

Existing connectors for electrically coupling the flexible conductive wire 122 to the light sources 124 have been widely adopted in a variety of industrial and consumer electronic applications. The connectors are formed with a unified pin count equal to six or greater. A drawback of using the existing unified connectors is that an actual connector size of the six-pin connectors is much greater than a diameter of the flexible conductive wire 122 and volume of the light sources 124. The size of the existing six-pin socket is also out of proportion to the tabletop-sized Christmas tree. As a result, it is difficult, if not impossible, to conceal the existing six-pin socket as connectors within the needles 112. The aesthetic effect of the article 10 is seriously degraded due to the presence of such bulky six-pin sockets.

In contrast, the proposed connector 126 includes a two-pin socket design, which removes all unnecessary parts of the existing connector, which would otherwise occupy limited spaces in the article and bring uncomfortable visual experience to viewers. According to some embodiments, this minimization design of the connector 126 is critical for a tabletop-sized Christmas tree that has a height less than about 50 cm since all of the components of such a tabletop-sized Christmas tree should be scaled proportionally in order to maintain the overall aesthetic effect of the article.

Moreover, existing Christmas trees, especially the tabletop-sized desktop Christmas trees, can only manually arrange the light-emitting elements of the light sources to be close to the tips of the needles away from the support structure of the article. As a result, the uniformity and efficiency of the manual work to dispose the light sources close to the tips of the article are not satisfactory. In contrast, through appropriate design of the lengths of the leads 1244 of the respective light sources 124, the proposed article 10 serving as a Christmas tree can dispose the light sources 124 with respective light-emitting elements 1242 located at the tips of the needles away from the support structure 110 with high precision and improved manufacturing efficiency. Since a task of assembling and disposing of the light sources 124 can be accomplished by automated equipment, cost of the proposed article 10 can be reduced and performance of the proposed article 10 can be enhanced accordingly.

According to some embodiments, the plurality of light sources 124 may be electrically coupled to the flexible conductive wire 122 in parallel connection or series connection. In the configuration of parallel connection, one of the pair of leads 1244-1 (or 1244-2) of each light source 124 is directly electrically coupled to the conductive line 122-1 (or 122-2) and receives a substantially equal supply voltage from the battery 130 or the power socket 140, while the other of the pair of leads 1244-2 (or 1244-1) is electrically coupled to the conductive line 122-2 (or 122-1) and connected to ground. In the configuration of parallel connection, the conductive line 122-1 (or 122-2) carrying power is configured to supply the predetermined supply voltage to each of the light sources 124 while the current level of the conductive line 122-1 (or 122-2) is equally distributed to all of the connected light sources 124.

In the configuration of series connection, one of the pair of leads 1244-1 (or 1244-2) of each target light source 124 is electrically coupled to the conductive line 122-1 (or 122-2) through all the intermediate light sources 124 between the target light source 124 and the battery 130 or the power socket 140, and receives a substantially equal supply current from the battery 130 or the power socket 140, while the other of the pair of leads 1244-2 (or 1244-1) is electrically coupled to the conductive line 122-2 (or 122-1) and connected to ground. In the configuration of series connection, the conductive line 122-1 (or 122-2) carrying power is configured to supply the predetermined supply current to each of light sources 124 while the total voltage level of the conductive line 122-1 (or 122-2) is equally distributed to all of the connected light sources 124.

Figure 4:
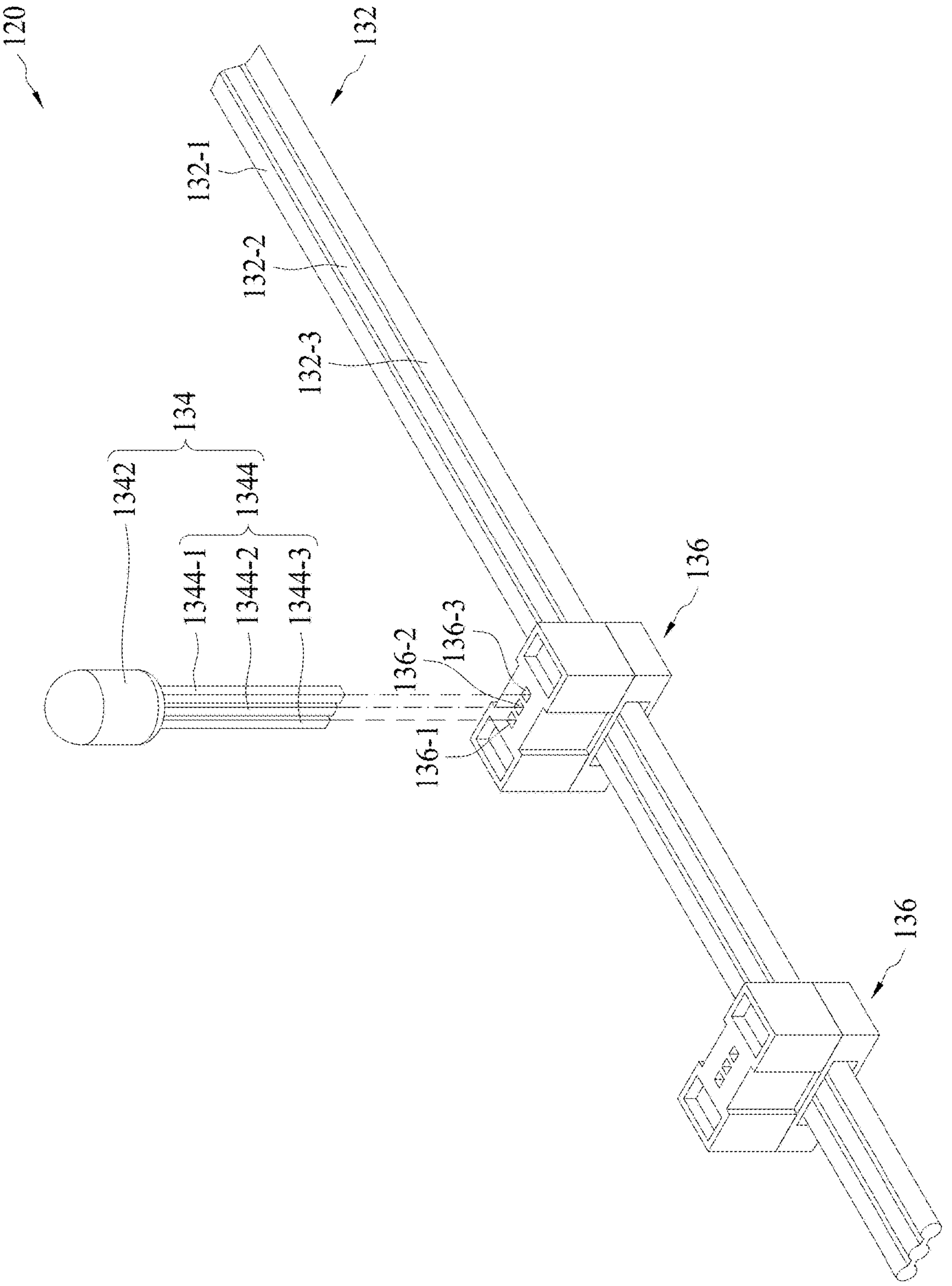
FIGS. 4 and 5 are schematic diagrams of a light string, in accordance with some embodiments of the present disclosure.

FIG. 4 is a schematic diagram of the light string 120, in accordance with some embodiments of the present disclosure. The light string 120 shown in FIG. 4 is similar to that shown in FIG. 3, and thus descriptions of similar features are not repeated for brevity. The main difference between the light string 120 shown in FIG. 4 and that shown in FIG. 3 is that the flexible conductive wire 122, the light sources 124 and the connectors 126 are replaced with their three-wire counterparts, i.e., a flexible conductive wire 132, light sources 134 and connectors 136, respectively.

According to some embodiments, the light source 134 includes a light-emitting element 1342 and a set of leads 1344 including leads 1344-1, 1344-2 and 1344-3. The leads 1344-1 and 1344-2 may have materials and configurations similar to those of the leads 1244-1 and 1244-2, while the additional lead 1344-3 is provided for additional functions. In a single-color configuration of the light-emitting element 1342, the lead 1344-3 is used to provide a control signal to control a flashing pattern or on-off periods of the light-emitting element 1342. Alternatively, in a dual-color configuration of the light-emitting element 1342, the leads 1344-1 (or 1344-2) and 1344-3 may be used to deliver power to a first color component and a second color component, respectively, of the dual-color light-emitting element 1342.

According to some embodiments, the flexible conductive wire 132 includes conductive lines 132-1, 132-2 and 132-3. The conductive lines 132-1 and 132-2 have materials and configurations similar to those of the conductive lines 122-1 and 122-2. In a single-color configuration of the light-emitting element 1342, the additional conductive line 132-3 may be used to convey power or signal for additional uses, e.g., providing a control signal for determining the flash pattern or the on-off period of the light sources 134. Alternatively, in a dual-color configuration of the light-emitting element 1342, the conductive line 132-1 (or 132-2) and 132-3 are used to deliver power to the first color component and the second color component, respectively, of the dual-color light-emitting element 1342.

According to some embodiments, the connector 136 is a three-pin connector including three slots 136-1, 136-2 and 136-3. The three slots 136-1, 136-2 and 136-3 are used for receiving the three leads 1344-1, 1344-2 and 1344-3 and aligning the leads 1344-1, 1344-2 and 1344-3 with the conductive lines 132-1, 132-2 and 132-3, respectively, or in another alignment order. The slots 136-1, 136-2 and 136-3 can be arranged in a line shape or in different shapes.

Figure 5:
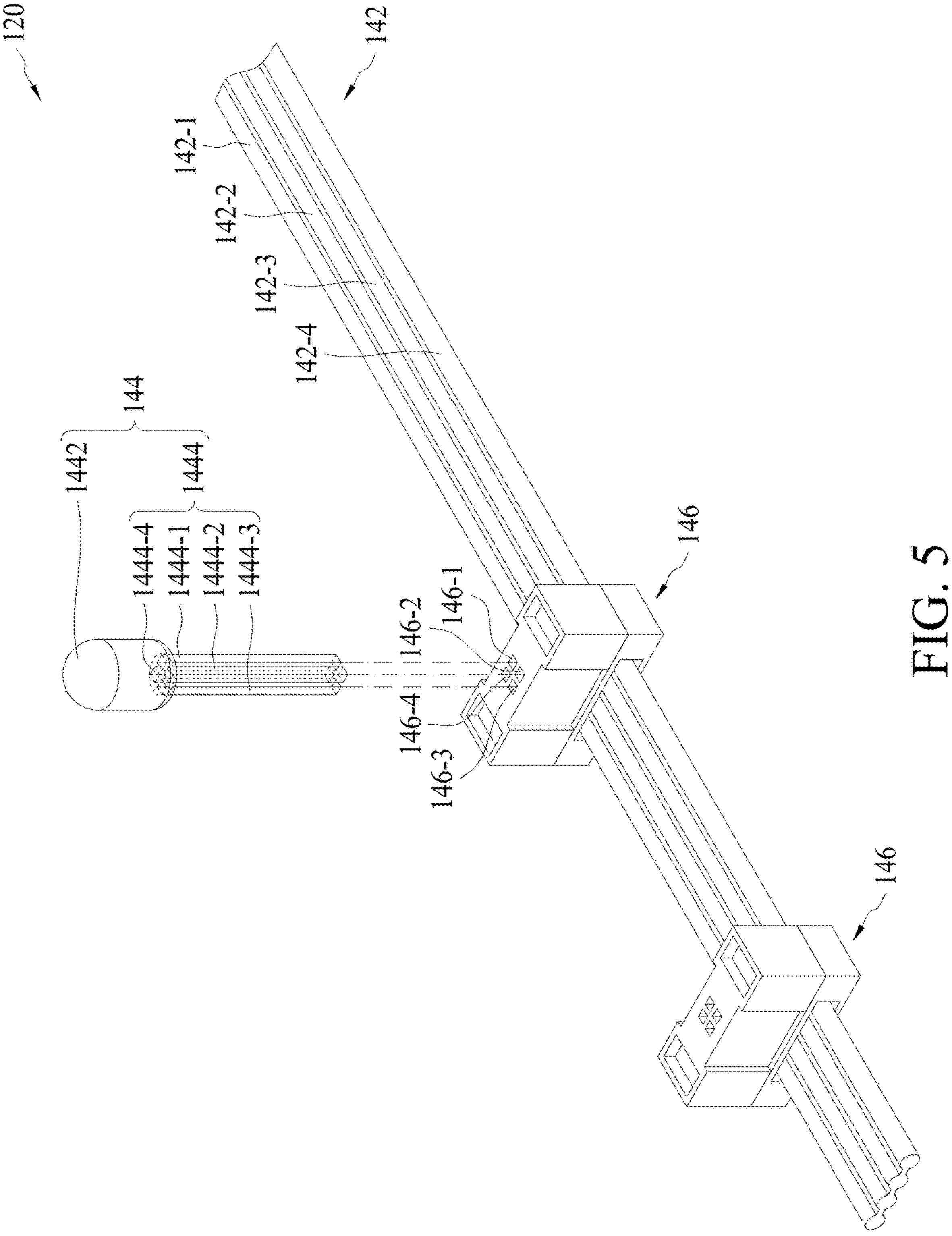

FIG. 5 is a schematic diagram of the light string 120, in accordance with some embodiments of the present disclosure. The light string 120 shown in FIG. 5 is similar to that shown in FIG. 3 or FIG. 4, and thus descriptions of similar features are not repeated for brevity. The main difference between the light string 120 shown in FIG. 5 and that shown in FIG. 3 or FIG. 4 is that the flexible conductive wire 122, the light sources 124 and the connectors 126 are replaced with their four-wire counterparts, i.e., a flexible conductive wire 142, light sources 144 and connectors 146, respectively.

According to some embodiments, the light source 144 includes a light-emitting element 1442 and a set of leads 1444 including leads 1444-1, 1444-2, 1444-3 and 1444-4. The leads 1444-1 and 1444-2 may have materials and configurations similar to those of the leads 1244-1 and 1244-2, while the additional leads 1444-3 and 1444-4 are provided for additional functions. In a dual-color configuration of the light-emitting element 1442, the lead 1444-3 is used to provide a control signal to control a flashing pattern or on-off periods of the light-emitting element 1442, and the leads 1444-1 and 1444-4 are used to deliver power to a first color component and a second color component, respectively, of a dual-color light-emitting element 1442. Alternatively, in a triple-color configuration of the light-emitting element 1342, the leads 1444-1 (or 1344-2), 1444-3 and 1344-4 may be used to deliver power to the first color component, the second color component and a third color component, respectively, of a triple-color light-emitting element 1442.

According to some embodiments, the flexible conductive wire 142 includes conductive lines 142-1, 142-2, 142-3 and 142-4. The conductive lines 142-1 and 142-2 have materials and configurations similar to those of the conductive lines 122-1 and 122-2. In a dual-color configuration of the light-emitting element 1442, the additional conductive line 142-3 may be used to convey power or signal for additional uses, e.g., providing a control signal for determining a flash pattern or on-off periods of the light sources 134, and the conductive line 142-1 (or 142-2) and the additional conductive line 142-4 are used to deliver power to a first color component and a second color component, respectively, of the dual-color light-emitting element 1442. Alternatively, in a triple-color configuration of the light-emitting element 1442, the conductive line 142-1 (or 142-2), 142-3 and 142-4 are used to deliver power to the first color component, the second color component and a third color component, respectively, of the triple-color light-emitting element 1442.

According to some embodiments, the connector 146 is a four-pin connector including four slots 146-1, 146-2, 146-3 and 146-4. The four slots 146-1, 146-2, 146-3 and 146-4 are used for receiving the four leads 1444-1, 1444-2, 1444-3 and 1444-4 and aligning the leads 1444-1, 1444-2, 1444-3 and 1444-4 to the conductive lines 142-1, 142-2, 142-3 and 142-4, respectively, or in another alignment order. The slots 146-1, 146-2 146-3 and 146-4 can be arranged in a line shape or in different shapes.

Figure 6B:
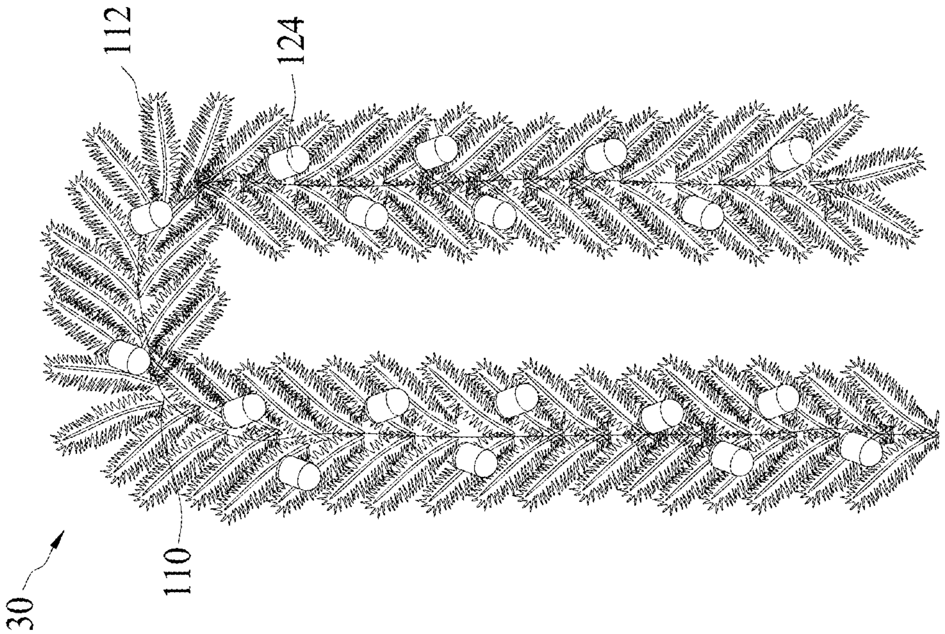
FIGS. 6A and 6B are perspective views of two articles, in accordance with some embodiments of the present disclosure.
Figure 6A:
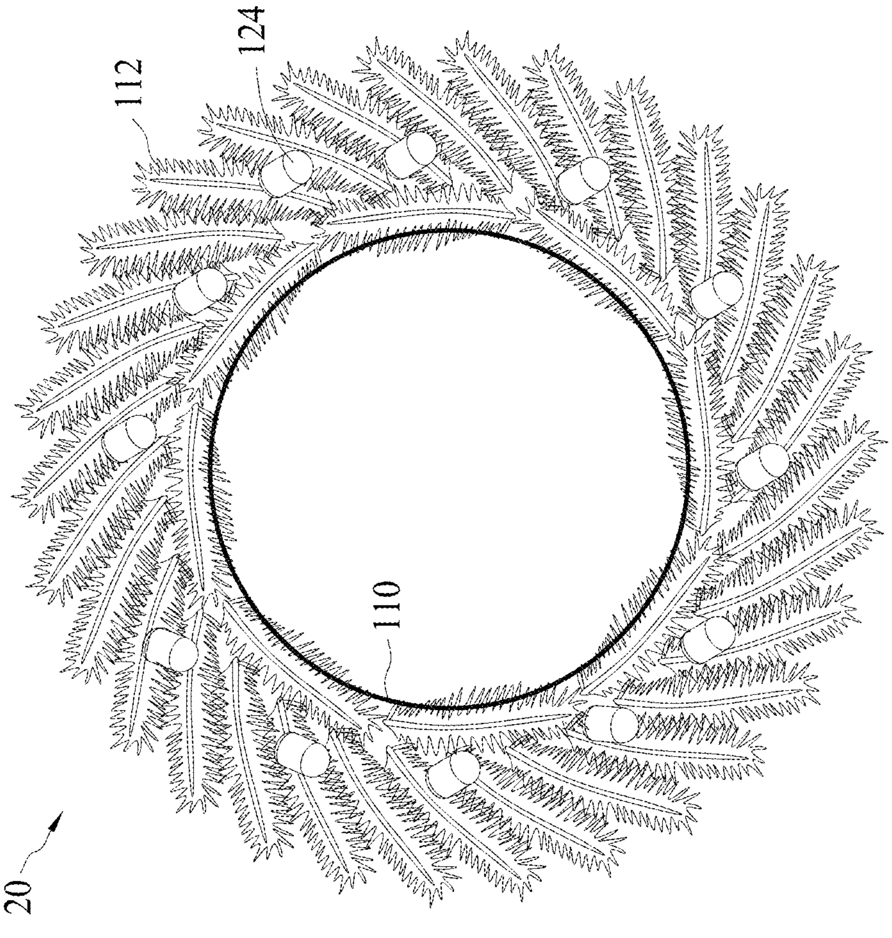

FIGS. 6A and 6B are perspective views of two articles 20 and 30, respectively, in accordance with some embodiments. Referring to FIG. 6A, a wreath 20 is provided with a plurality of needles 112 connected to one or more stems 110 and one or more light strings 120 (not separately shown in FIG. 6A, but illustrated in FIG. 6C). The needles 112 may be arranged to form a ring or circular shape from a top-view perspective. The light string 120 includes a plurality of light sources 124 attached thereto and crossing gaps between the needles 112. According to some embodiments, the light sources 124 are arranged on a same side of the wreath 20. The needles of the wreath 20 may form multiple layers of the wreath 20, where the light sources 124 may be arranged in different depths or layers of the wreath 20, and some of the light sources 124 may be partially obstructed by the needles 112 of the wreath 20. Light of the light sources 124 may be emitted outward directly or indirectly through the gaps between the needles 112 of the wreath 20.

Figure 6C:
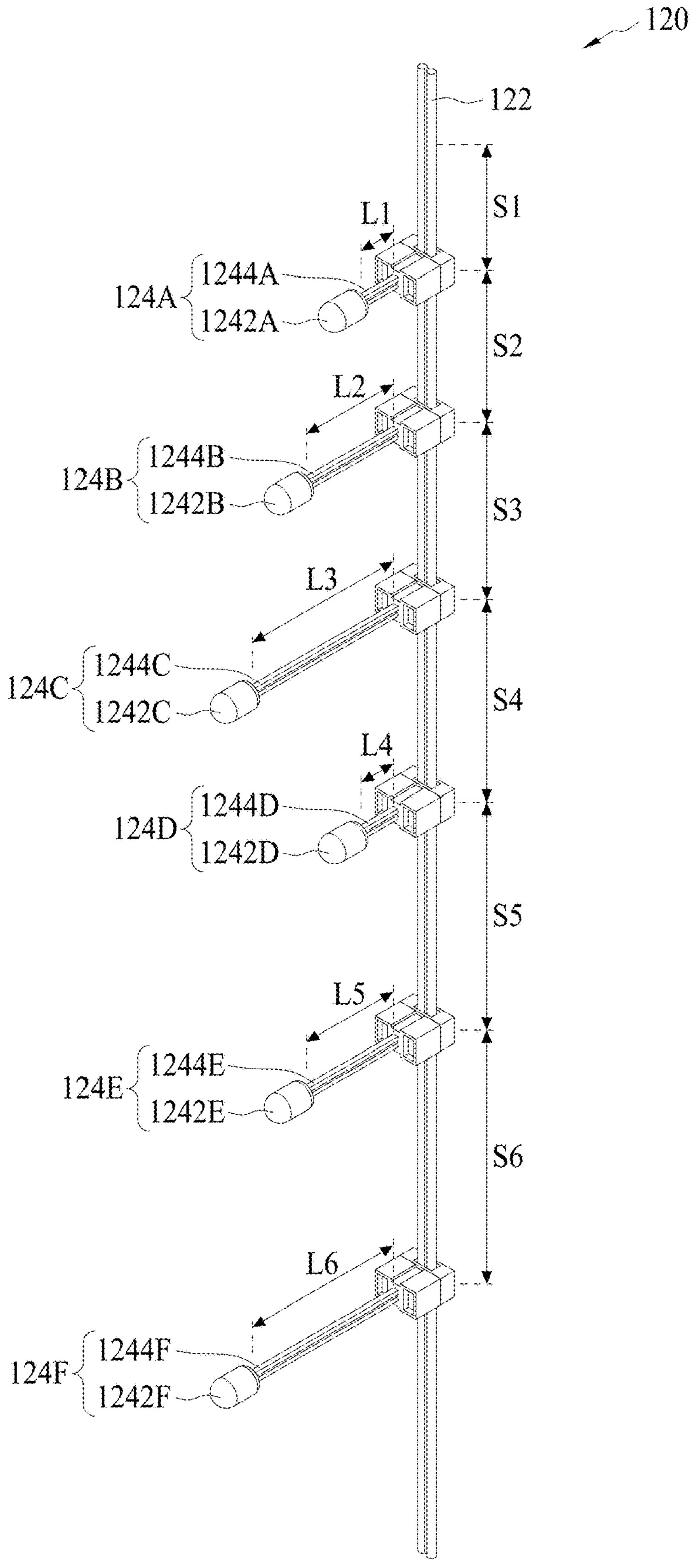
FIG. 6C is a schematic diagram of a light string, in accordance with some embodiments of the present disclosure.

Referring to FIG. 6B, a garland 30 is provided with a plurality of needles 112 connected to one or more stems 110 and one or more light strings 120 (not separately shown in FIG. 6B, but illustrated in FIG. 6C). Throughout the present disclosure, the support structure 110 of the wreath 20 or garland 30 is referred to as one type of a support structure 110 of the wreath 20 or garland 30. The needles 112 may be arranged to form a strip shape or an elongated shape from a top-view perspective. The light string 120 includes a plurality of light sources 124 attached thereto and interleaved with the needles 112. According to some embodiments, the light sources 124 are arranged on a same side of the garland 30. The needles of the wreath 20 may form multiple layers of the garland 30, where the light sources 124 may be arranged in different depths or layers of the garland 30, and some of the light sources 124 may be partially obstructed by the needles 112 of the garland 30. Light of the light sources 124 may be emitted outward directly or indirectly through the gaps between the needles 112 of the garland 30.

Referring to FIG. 6C, the flexible conductive wire 122 functions as a power channel and a connection hub for light sources 124, e.g., exemplary light sources 124A, 124B, 124C, 124D, 124E and 124F, wherein each of the light sources 124 includes a light-emitting element 1242 (e.g., exemplary light-emitting elements 1242A, 1242B, 1242C, 1242D, 1242E and 1242F) and a plurality of leads 1244 (e.g., exemplary leads 1244A, 1244B, 1244C, 1244D, 1244E and 1244F). According to some embodiments, the light-emitting element 1242 may be formed of a light-emitting diode (LED), a light bulb, or another suitable light-emitting device. According to some embodiments, conductive core layers of the flexible conductive wire 122 and the leads 1244 are formed of conductive materials, such as aluminum, copper, silver, gold, tungsten, iron, tin or other suitable conductive materials.

According to some embodiments, the light sources 124A to 124F are electrically coupled to the flexible conductive wire 122 through electrical coupling of the respective leads 1244A to 1244F and the flexible conductive wire 122. The electrical coupling can be achieved by soldering or electrical attachment through connectors or adaptors in a manner similar to that of the connector 126, 136 or 146 of the light string 120 shown in FIGS. 3 to 5. Further, the locations where the light sources 124A to 124F are electrically coupled to the flexible conductive wire 122 are determined as appropriate. According to some embodiments, adjacent pairs of the light sources 124A, 124B, 124C, 124D, 124E and 124F are spaced apart by distances or spacings S2, S3, S4, S5 and S6, respectively, on the flexible conductive wire 122. The distances S2 to S6 may be determined depending upon locations of the light sources 124A to 124F on the wreath 20 or the garland 30. The distances S2 to S6 may be substantially equal or different from each other.

According to some embodiments, the light-emitting element 1242 or light bulb of each of the light sources 124 is arranged close to the tips of the needles 112 of the wreath 20 or the garland 30 away from the respective stems 110. As a result, the illuminous effect of the light string 120 for the wreath 20 or the garland 30 becomes more eye-catching especially when the wreath 20 or the garland 30 is displayed against a dark background. According to some embodiments, since distances between the support structure 110 of the wreath 20 or the garland 30 to the tips of the needles 112 are substantially equal for most of the needles 112, the lengths L1 to L6 of the leads 1244 are made substantially equal.

According to some embodiments, the lengths of the leads 1244 of different light sources 124 are different and depend upon the locations of the light sources 124 on the light string 120 or upon the locations of the light sources 124 when they are dispersed in the wreath 20 or the garland 30. The leads 1244A, 1244B, 1244C, 1244D, 1244E and 1244F may have lead lengths L1, L2, L3, L4, L5 and L6, respectively. According to some embodiments, the lengths L1 to L6 of the respective leads 1244A to 1244F are adjusted such that the light-emitting elements 1242A to 1242F are dispersed in different depths or layers of the wreath 20 or the garland 30 for generating a sense of layering to viewers. According to some embodiments, the lengths L1 to L3 of the leads 1244A to 1244C, respectively, form a pattern with length variations, and the lengths L4 to L6 of the leads 1244D to 1244F, respectively, repeat the pattern of the leads 1244A to 1244C. For example, the lengths L1 to L3 or L4 to L6 in the pattern follow a relationship: L1<L2<L3 and L4<L5<L6. According to some embodiments, the pattern is repeated such that the lengths L1, L2 and L3 are substantially equal to L4, L5 and L6, respectively. An arrangement of a repeated pattern with different types of variations of the lengths of the leads 1244 may generate a sense of layering to viewers. Although only one pattern is discussed above for the leads 1244, other combinations of the lead lengths and more combinations of different patterns are also within the contemplated scope of the present disclosure. For example, another pattern of the lengths L1 to L3 follows a relationship: L1>L3>L2.

Figure 7:
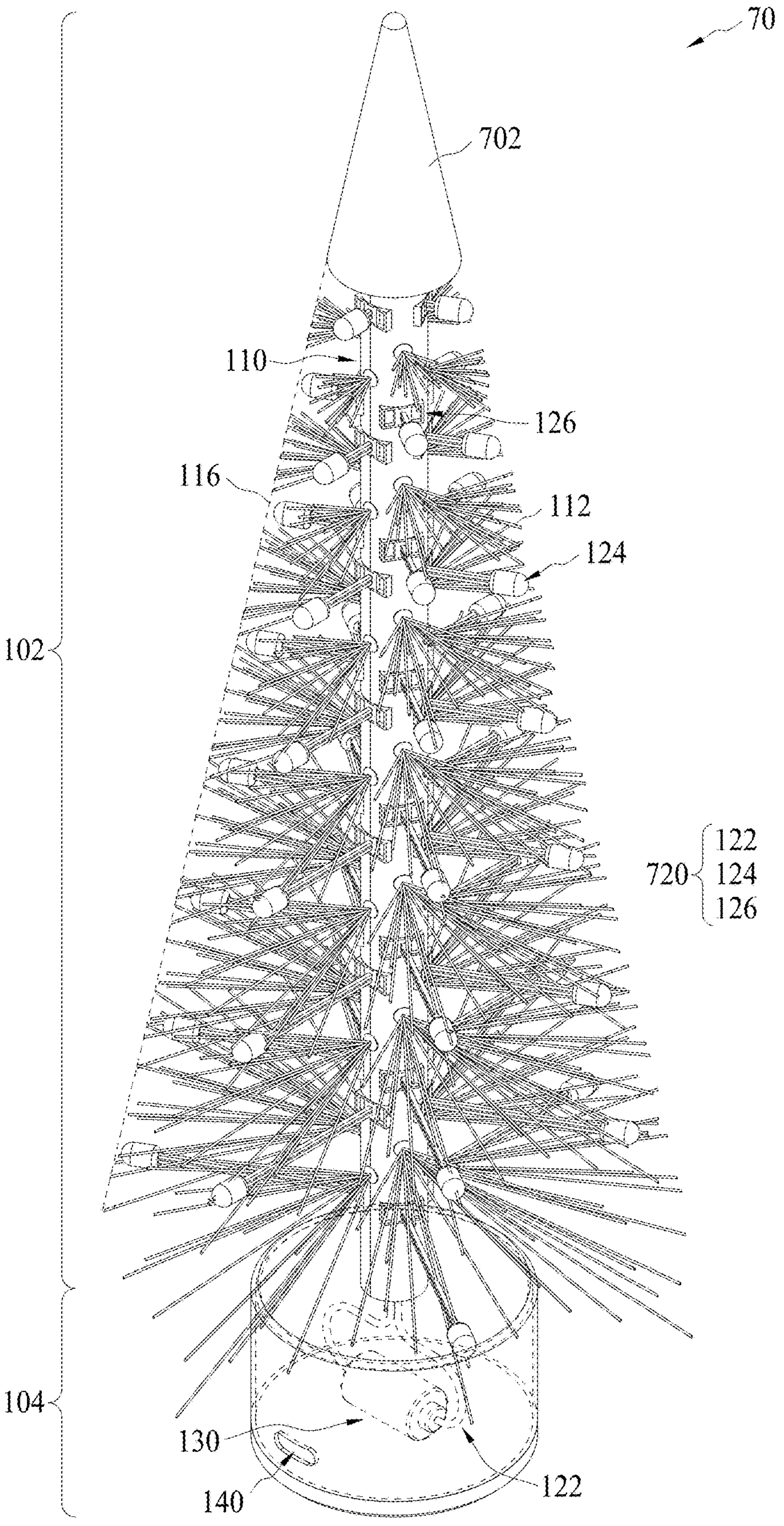
FIG. 7 shows a perspective view of an article, in accordance with some embodiments of the present disclosure.

FIG. 7 shows a perspective view of an article 70, in accordance with some embodiments. The article 70 includes a main body 102, a tree cap 702 covering the main body 102 and a pedestal 104 supporting the main body 102. According to some embodiments, the main body 102 includes a support structure 110, and a plurality of needles 112 or branches affixed, connected or attached to the support structure 110. The main body 102 or the support structure 110 is supported by and extends upward from the pedestal 104, wherein the needles 112 extend outward radially from the support structure 110. The needles 112 may include a needle shape. The tips of these needles 112 may form a cone-shaped profile or surface 116 of the article 10. According to some embodiments, the article 70 is similar to the article 10.

According to some embodiments, the article 70 includes a light string 720 disposed or extending in an interior portion or a hollow space of the support structure 110. The light string 720 includes a flexible conductive wire 122, a plurality of light sources 124 and a plurality of connectors 126. The light string 720 is similar to the light string 120 in many aspects, and thus descriptions of similar features are not repeated for brevity. A main difference between the light string 720 and the light string 120 is that the flexible conductive wire 122 of the light string 720 extends within the support structure 110, and the connectors 126 guide the leads 1244 (see FIG. 9A) of the light sources 124 to the flexible conductive wire 122 of the light string 720 through openings 802 (see FIG. 8A) on the support structure 110.

Figure 8A:
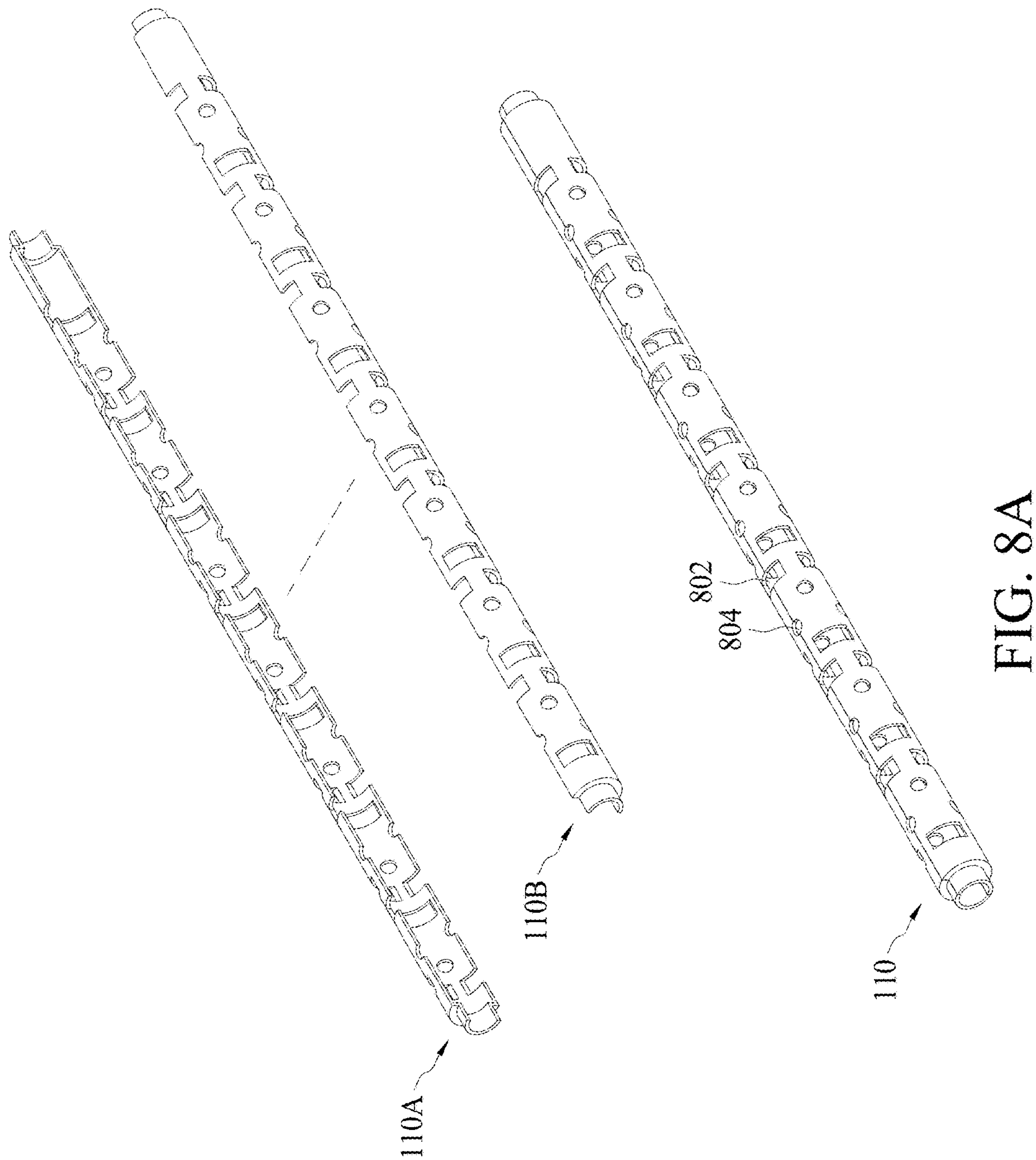
FIG. 8A shows perspective views of a support structure of an article, in accordance with some embodiments of the present disclosure.

FIG. 8A shows perspective views of a support structure 110 of the article 70, in accordance with some embodiments. The support structure 110 may be of a cylindrical shape with a hollow space in the core of the support structure 110. The support structure 110 may be formed of a first part 110A and a second part 110B, each of which is one half of a hollow cylinder. According to some embodiments, the support structure 110 includes a plurality of openings 802 and 804 formed on a surface of the support structure 110. As explained above, each of the openings 802 may be used to accommodate a connector 126 of the light string 720, while each of the openings 802 may be used to accommodate a base 904 of a needle cluster 902 (see FIG. 9B).

Figure 8B:
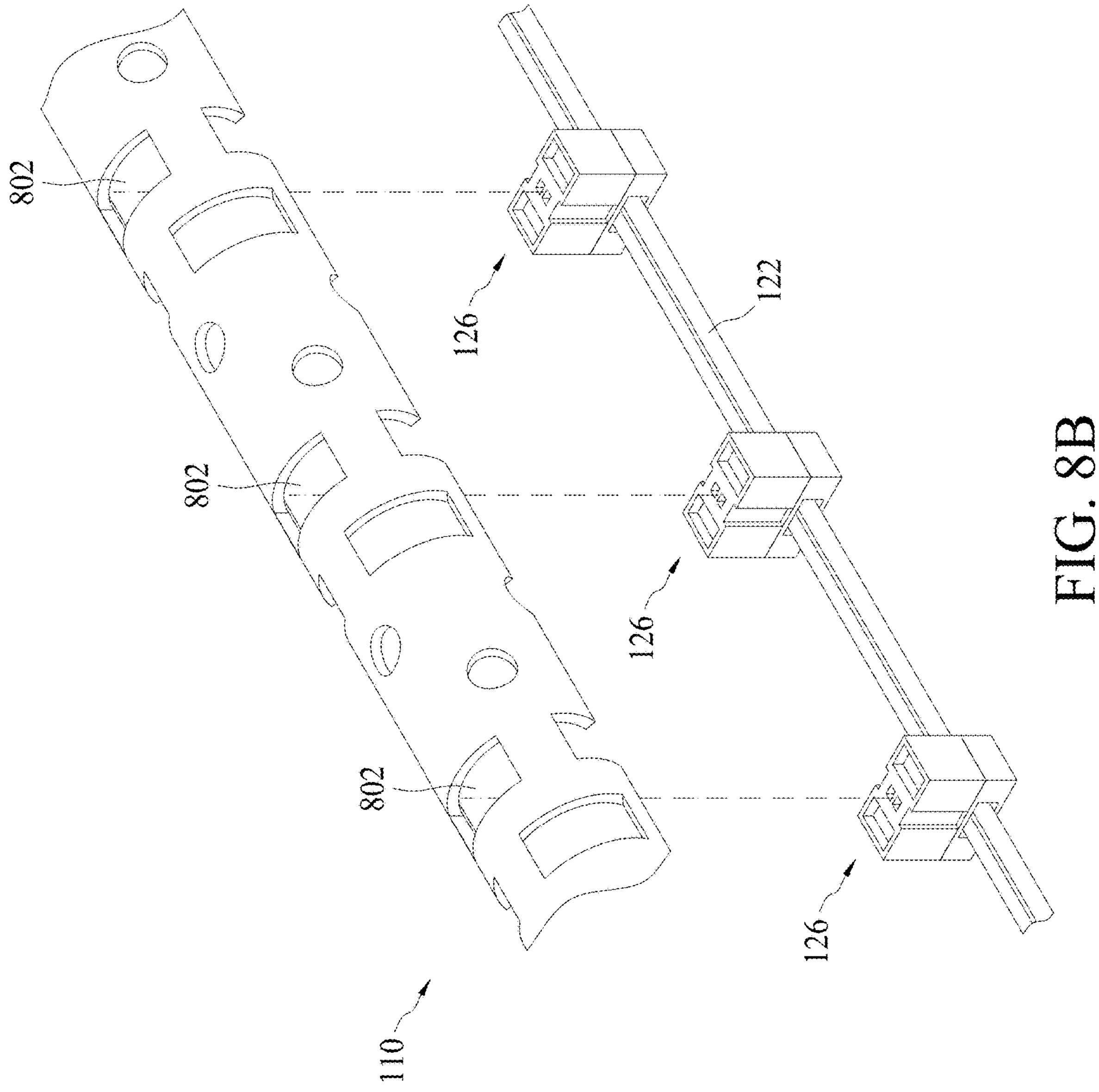
FIGS. 8B and 8C show an exploded view and a combined view, respectively, of a support structure and a light string of an article, in accordance with some embodiments of the present disclosure.

FIG. 8B shows an exploded view of the support structure 110 and the light string 720 of the article 70, in accordance with some embodiments. The openings 802 may be formed to fit the dimensions of the connectors 126, e.g., of a rectangular shape or another suitable shape, such that the connectors 126 can be inlaid or inserted in the opening 802 of the support structure 110. The connectors 126 can be coupled to the flexible conductive wire 122 on an inner side of the support structure 110 and coupled to the corresponding light sources 124 on an outer side of the support structure 110.

Figure 8C:
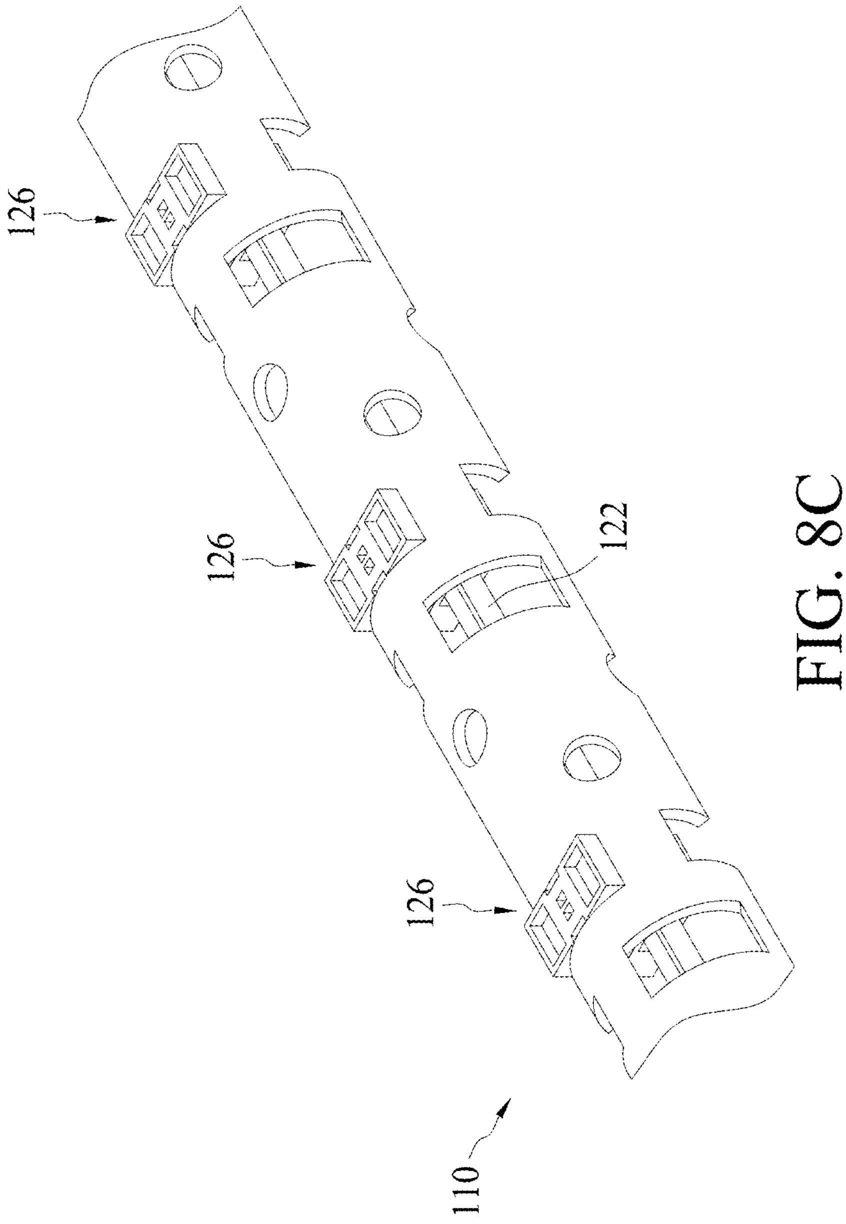

FIG. 8C shows a combined view of the support structure 110 and the light string 720 of the article 70, in accordance with some embodiments. When the connectors 126 are inlaid on the corresponding openings 802, the openings 802 are substantially filled. Referring to FIG. 7 and FIG. 8C, since the connectors 126 of the light string 720 are attached to the support structure 110, the connectors 126 are less visible due to their deep locations within the article 70, and an aesthetic effect of the article 70 may be better than that of the article 10.

Figure 9A:
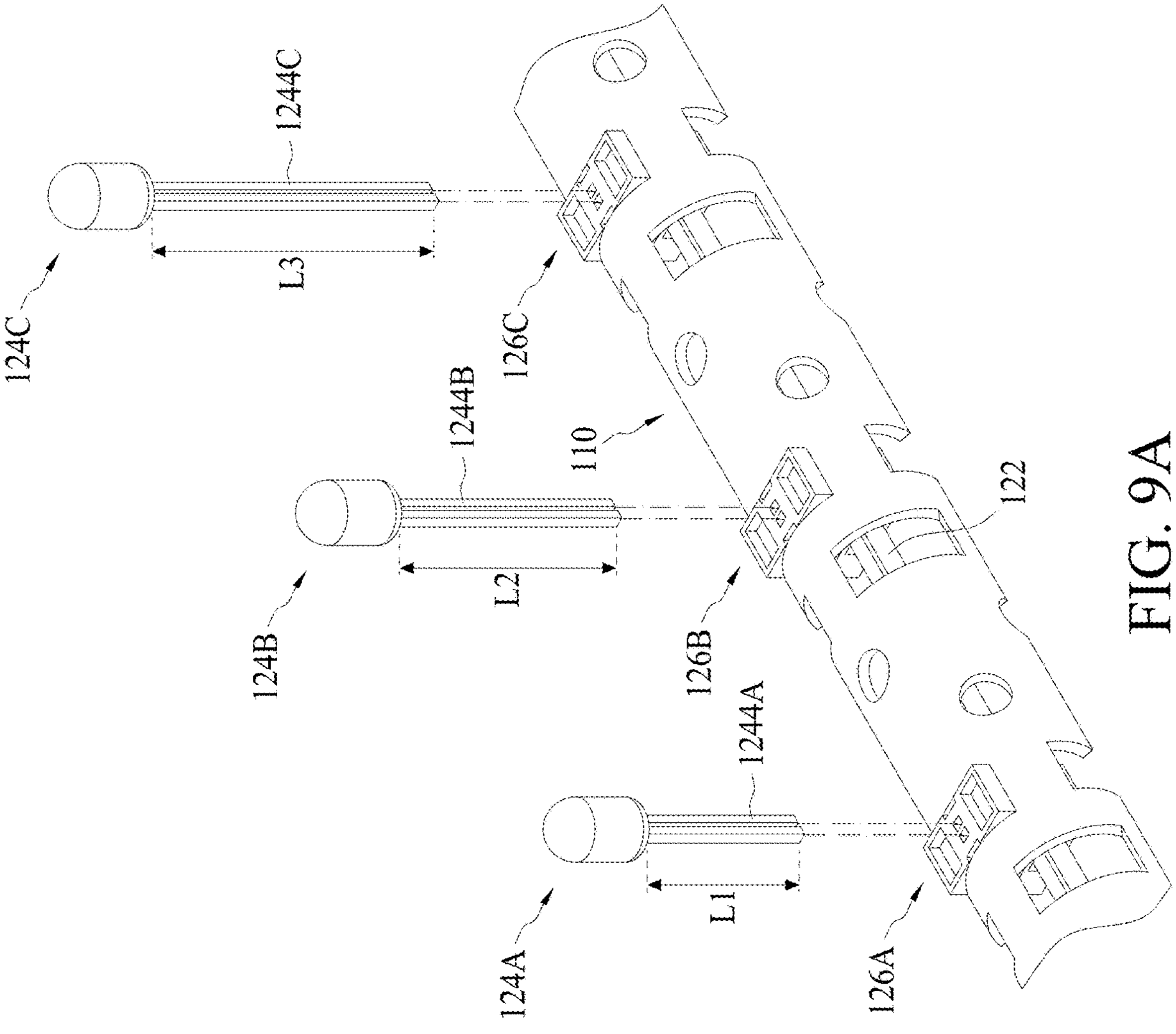
FIG. 9A shows an exploded view of a light string and light sources of an article, in accordance with some embodiments of the present disclosure.

FIG. 9A shows an exploded view of the light string 720 and light sources 124 of the article 70, in accordance with some embodiments. Three exemplary light sources 124A, 124B and 124C are configured to be electrically coupled to the flexible conductive wire 122 through guiding of the corresponding connectors 126A, 126B and 126C. According to some embodiments, the light sources 124A, 124B and 124C include respective leads 1244A, 1244B and 1244C with respective lead lengths L1, L2 and L3. Referring to FIG. 2A and FIG. 9A, the configuration of the flexible conductive wire 122 of the light string 720 is similar to that of the flexible conductive wire 122 shown in FIG. 2A, wherein the lengths L1, L2 and L3 of the respective leads 1244A to 1244C depend upon the locations of the light sources 124A to 124C on the light string 720 or depend upon their heights on the article 70 when they are attached to the article 70. According to some embodiments, a horizontal distance between the support structure 110 and the surface 116 may increase at positions of decreased height from a top of the article 70 to a bottom of the article 70. Therefore, when the light sources 124A, 124B and 124C are arranged on the support structure 110 from a height closer to the tree cap 706 to a height closer to the pedestal 104, their lead lengths L1, L2 and L3 would be monotonically increasing, i.e., in a relationship of L1<L2<L3. According to some embodiments, spacing values between the light sources 124A, 124B and 124C on the flexible conductive wire 122 are substantially equal since these spacing values represent the vertical spacing values of the light sources 124 on the support structure 110.

Figure 9B:
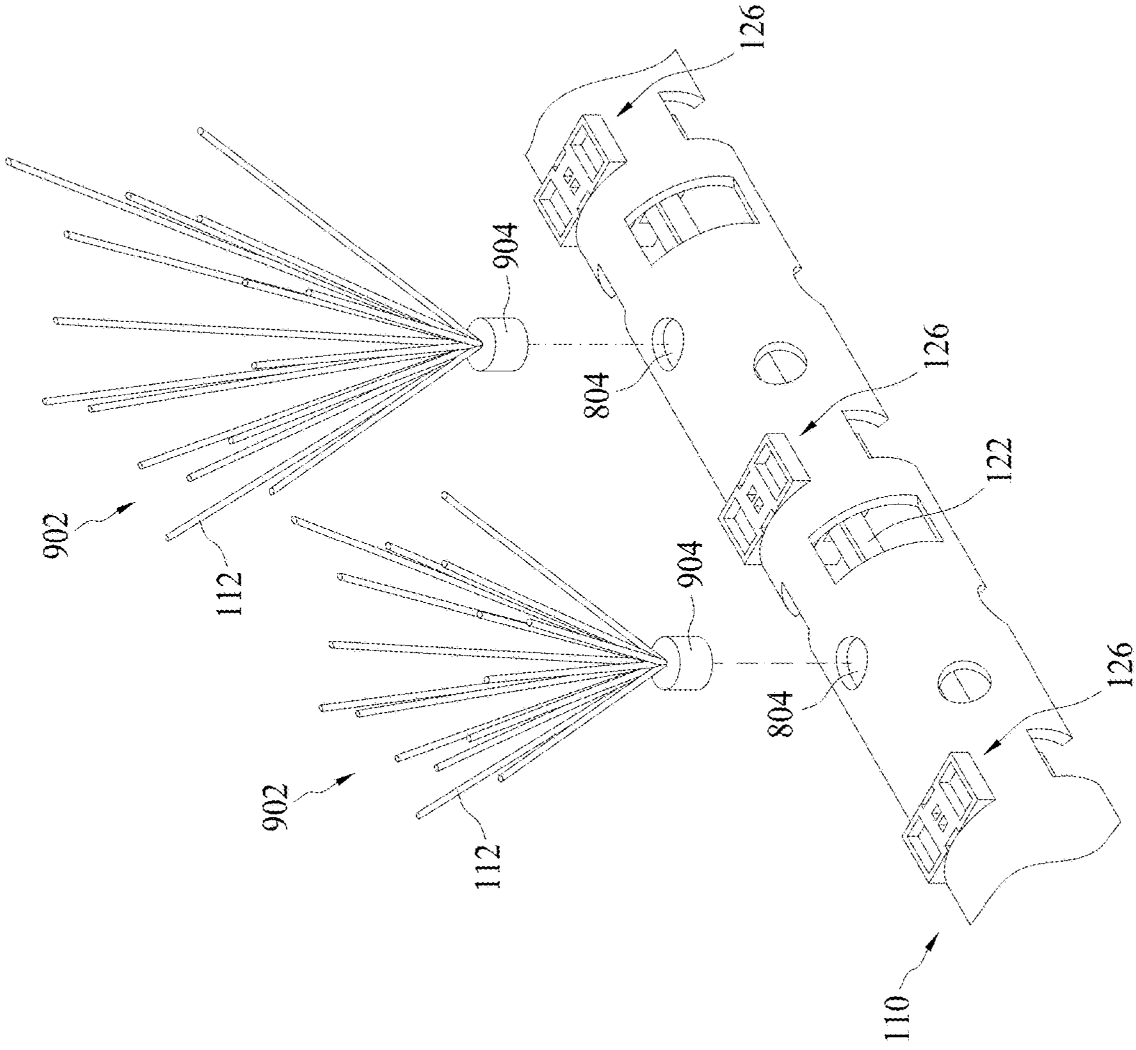
FIG. 9B shows an exploded view of a light string and needle clusters of an article, in accordance with some embodiments of the present disclosure.

FIG. 9B shows an exploded view of the light string 720 and the needle clusters 902 of the article 70, in accordance with some embodiments. Each of the needle clusters 902 includes a plurality of needles 112 and a base 904 used to bind the needles 112. The needles 112 may be formed to extend radially from the base 904. According to some embodiments, the openings 804 on the support structure 110 have a shape, e.g., a circular shape from a top-view perspective, corresponding to a shape of the base 904 to allow the base 904 to be inlaid thereon. Referring to FIG. 7 and FIG. 9B, when the connectors 126 and the needle clusters 902 are attached to the support structure 110 through the openings 802 and the openings 804, respectively, the support structure 110, the light sources 124 and the needles 112 can block most views of the flexible conductive wire 122 and the connectors 126, and therefore the aesthetic effect of the article 70 can be improved as compared to existing desktop Christmas trees.

The foregoing outlines structure of several embodiments so that those skilled in the art may better understand the aspects of the present disclosure. Those skilled in the art should appreciate that they may readily use the present disclosure as a basis for designing or modifying other operations and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An article, comprising: a support structure; a plurality of needles connected to the support structure; and a light string comprising: a flexible conductive wire affixed to the support structure; and a plurality of light sources, each including at least two leads electrically coupled to the flexible conductive wire, wherein the leads of the light sources arranged at different height of the article comprise different lengths; wherein a distance between the support structure and tips of respective needles away from the support structure is substantially equal to a length of the leads of respective light sources disposed corresponding to the respective tips.

2. The article of claim 1, wherein the support structure and the plurality of needles form a tree, a wreath, or a garland.

3. The article of claim 2, wherein the tree has a height less than about 50 cm.

4. The article of claim 1, wherein the lengths of the leads of the respective light sources increase from a top to a bottom of the article.

5. The article of claim 1, wherein the light sources are disposed adjacent to a profile formed by tips of the needles away from the support structure.

6. The article of claim 1, wherein each of the light sources comprises a light-emitting element.

7. The article of claim 1, wherein the light string further comprises a plurality of connectors coupling the leads of the respective light sources to the flexible conductive wire.

8. The article of claim 7, wherein the flexible conductive wire either (1) wraps around an exterior portion of the support structure with the plurality of connectors arranged close to the exterior portion of the support structure or (2) is disposed in an interior portion of the support structure with the plurality of connectors inlaying on the support structure.

9. The article of claim 7, wherein each of the light sources comprises two lead lines, and each of the connectors comprises a two-pin socket.

10. An article, comprising: a main body, the main body comprising a support structure; and a light string affixed to the support structure, the light string comprising: a flexible conductive wire; a plurality of light sources, wherein each of the light sources includes at least two leads electrically coupled to the flexible conductive wire; and a plurality of connectors guiding the leads of the respective light sources to the flexible conductive wire, wherein the leads of the light sources arranged at different height of the main body comprises different lengths, wherein the support structure is connected to a plurality of needles, wherein a distance between the support structure and tips of the respective needles away from the support structure is substantially equal to a length of the leads of the respective light sources disposed corresponding to the respective tips.

11. The article of claim 10, wherein the flexible conductive wire is positioned in an interior portion of the support structure.

12. The article of claim 11, wherein the plurality of needles are arranged as a plurality of needle clusters, wherein each of the plurality of needle clusters includes a base inlaying on a first opening of the support structure.

13. The article of claim 12, wherein each of the plurality of connectors is inlaying on a second opening of the support structure.

14. The article of claim 10, wherein each of the connectors comprises at least two slots configured to receive leads of the respective light sources.

* * * * *